United States Patent [19]

Chemelli et al.

[11] 4,030,122
[45] June 14, 1977

[54] RECORDING APPARATUS UTILIZING SMALL OPTICAL COMPONENTS

[75] Inventors: Robert Guido Chemelli, Morristown; Dwight Dexter Cook, New Providence; Richard Carrel Miller, Summit, all of N.J.

[73] Assignee: Bell Telephone Laboratories, Incorporated, Murray Hill, N.J.

[22] Filed: July 28, 1975

[21] Appl. No.: 599,850

[52] U.S. Cl. .............................. 358/127; 346/76 L; 358/297
[51] Int. Cl.² ...................................... H04N 5/76
[58] Field of Search .......... 178/6.6 R, 6.7 R, 6.7 A, 178/7.6, DIG. 28, DIG. 2; 346/76 R, 76 L, 108; 179/100.3 Z, 100.3 B; 340/173 LM, 173 LS; 350/96 GN, 181, 190; 358/127, 130, 132, 200, 297

[56] References Cited

UNITED STATES PATENTS

| | | | |
|---|---|---|---|
| 1,597,487 | 8/1926 | St. Clair | 346/108 |
| 2,672,072 | 3/1954 | Sachtleben et al. | 350/181 |
| 3,349,174 | 10/1967 | Warschauer | 178/7.6 |
| 3,441,948 | 4/1969 | Ondis | 346/76 L |
| 3,465,352 | 9/1969 | Carlson | 346/76 L |
| 3,534,166 | 10/1970 | Korpel | 178/6.6 R |
| 3,549,826 | 12/1970 | Browning | 174/100.3 B |
| 3,720,784 | 3/1973 | Maydan et al. | 178/6.6 R |
| 3,732,363 | 5/1973 | Glenn, Jr. | 346/76 L |
| 3,811,009 | 5/1974 | Fukumoto et al. | 178/6.7 R |
| 3,836,225 | 9/1974 | Wilde et al. | 178/7.6 |

OTHER PUBLICATIONS

Uchida et al., Optical Characteristics of a Light-Focusing Fiber Guide and its Applications, IEEE Jour. of Quantum Electronics, vol. QE-6, No. 10, Oct. 1970, pp. 606–612.

*Primary Examiner*—Raymond F. Cardillo, Jr.
*Attorney, Agent, or Firm*—Lester H. Birnbaum

[57] ABSTRACT

Disclosed is an apparatus for recording optical information by means of laser machining of holes on a recording medium. The optical components include a solid state laser, means for converting the light emanating from the laser into a circular beam, and an optical fiber with a graded index of refraction for focusing the light onto the recording medium. The components are mounted on a support arm which is deflected at a rate sufficient to achieve line scan of the medium, while frame scan is achieved by translating either the support arm or the film in a direction essentially perpendicular to the plane of deflection. Means may also be included for displaying the printed information on a screen.

10 Claims, 9 Drawing Figures

RECORDING APPARATUS UTILIZING SMALL OPTICAL COMPONENTS

BACKGROUND OF THE INVENTION

This invention relates to means for recording video information and in particular to apparatus employing laser machining of hole in a film for such purpose.

Recently, a new class of apparatus has been proposed for recording the displaying optical information. Such systems rely upon the use of laser light to remove portions of a metallic film selectively and thereby create a desired pictorial representation. In one example (see U.S. Pat. No. 3,720,784), the output of a gas laser is transformed into a beam of amplitude-modulated pulses of coherent radiation by means of an acousto-optic modulator. The modulator is driven by amplitude-modulated pulses constituting a facsimile signal representing the pictorial image. The optical pulses thus produced are directed to a metal film to machine a two-dimensional array of discrete holes therein representing the original optical information. Line scan of the film is achieved by a deflecting mirror mounted on a galvanometer and vertical scan by moving the film in a direction transverse to the direction of the line scan.

The above-described system offers an attractive possibility for facsimile printing in a wide variety of applications. However, several problems are presented by this approach, such as expensive optical modulators, poor laser efficiency, complexity of the optical and electronic systems, and physical size of the printer package. The first two mentioned problems can be solved by substituting a GaAs laser for the gas laser. However, the design of such a system in a way which would reduce its complexity and size while maintaining adequate optical efficiency remains a problem.

It is therefore a primary object of the invention to provide a facsimile printer composed of micro-optical components including a solid state laser which utilizes a simple and inexpensive optical system.

SUMMARY OF THE INVENTION

This and other objects are achieved in accordance with the invention. The basic optical components preferably include a solid state laser, a hemicylindrical lens which corrects astigmatism and converts the laser output from an elliptical beam to a circular beam, and a graded-index-of-refraction optical fiber for focusing the beam onto the recording medium. These components are mounted on a support arm extending from a deflecting means such as a galvanometer. The arm is deflected so as to achieve line scan of the medium, and frame scan is achieved by moving either the arm or the recording medium in a direction essentially perpendicular to the plane of deflection.

BRIEF DESCRIPTION OF THE DRAWING

These and other features of the invention are delineated in detail in the description to follow. In the drawing.

DETAILED DESCRIPTION

Figure 1:
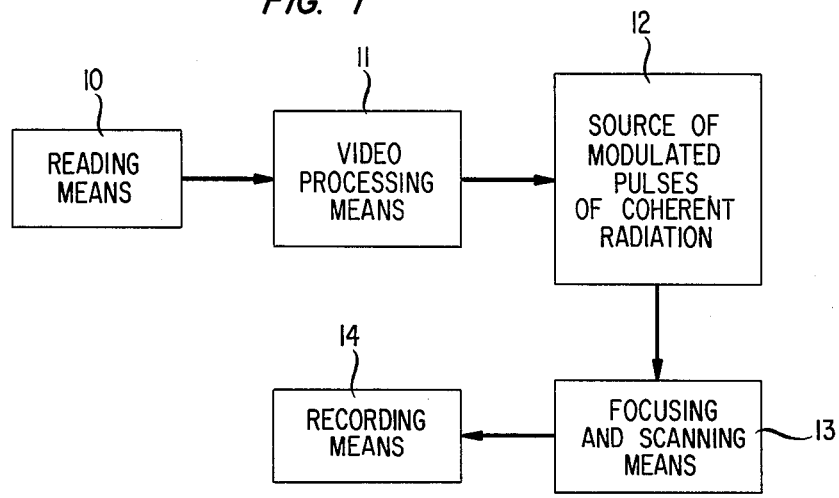
FIG. 1 is a block diagram of a basic facsimile system which may utilize the present invention.

The basic components of a facsimile system are illustrated in block form in FIG. 1. Reading means, 10, scans a picture or document to be recorded. This means may take a variety of forms known in the art. For example, a laser beam may be scanned across a document by a series of deflecting mirrors placed orthogonally to achieve horizontal and vertical deflection, and the beam reflected by the document sampled by an array of photodetectors. (See, for example, U.S. Pat. No. 3,720,784 issued Mar. 13, 1973 to Maydan, et al). An alternative approach is to utilize a charge coupled liner imaging array which is placed on a moving carriage in such a way that the array detects light reflected from an entire line of the document, and frame scan is achieved by moving the linear array over the document as each line is sampled and the information read out of the device. (See. U.S. Pat. No. 3,867,569 issued to H. A. Watson.)

It will be realized that these are only two examples of reading means well known in the art, and further discussion of this portion of the system is not necessary for an understanding of the invention.

Figure 2A:
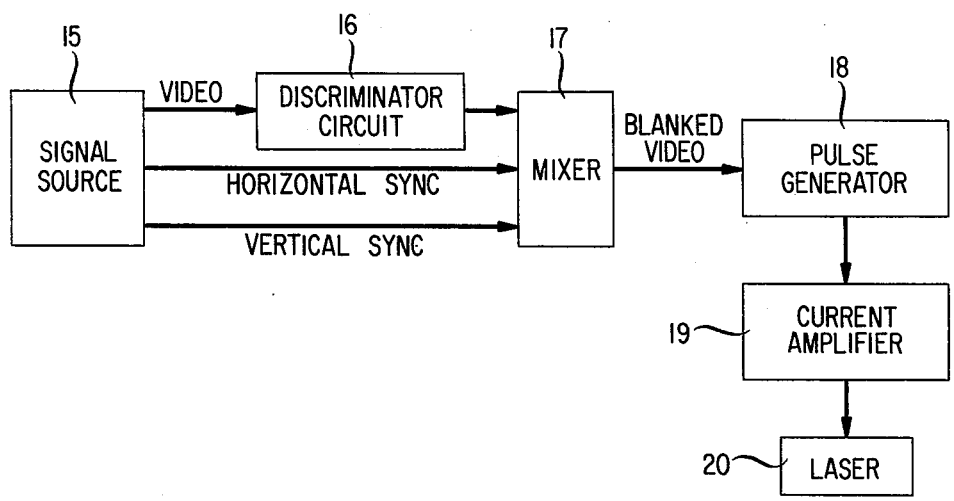
FIGS. 2A-2B are block diagrams of two alternative embodiments of a portion of the basic system shown in FIG. 1.

The video information is then processed as indicated by block 11 to convert the video signal into a series of electrical pulses, representative of the image, which are suitable for driving the source of coherent pulses 12. This portion of the system is shown, in two alternative embodiments, in the block diagram of FIGS. 2A and 2B. As mentioned above, the electrical pulses may be produced by an array of photodetectors or a CCD linear array, designated as the signal source 15 of FIG. 2A-2B. In the case of bilevel (black and white) printing as shown in FIG. 2A, the video signal is introduced into an amplitude discriminator circuit, 16, which produces output pulses only for an input signal above a predetermined voltage level thereby converting grey areas to black or white. This signal is then combined with the horizontal and vertical sync signals in mixer 17 to provide the appropriate time slots for horizontal and vertical scan of the printer. A blanked signal is thus produced which will be off during horizontal and vertical retrace. The resulting signal is used to gate pulse generator 18, which in this particular embodiment was a Hewlett-Packard 214A pulser operating at a frequency of 250 KHz with a pulse duration of approximately 100 nsec. The frequency and line scan time were chosen for a resolution of 1600 elements/line and can be adjusted for particular needs. The resulting pulses drive a current amplifier, 19, which in this system was Motorola MRF 621 Amplifier. The output from the amplifier drives the laser, 20, for printing the pictorial image. The peak amplitude and width of the laser current pulse was set by adjusting the amplitude and width of the pulse generator output pulses. The pulses were typically set for a width of 100 nsec.

Figure 2B:
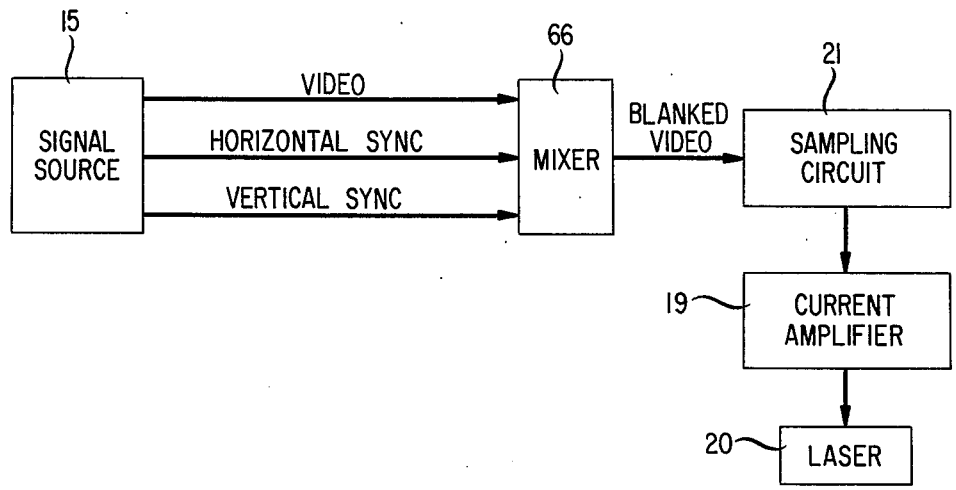

When it is desired to record documents having various grey scales, the system shown in FIG. 2B may be employed (elements corresponding to FIG. 2A are similarly numbered). In this case, the video, horizontal sync, and vertical sync signals are combined in a similar manner as before in mixer 66 to produce the blanked video signal. The signal is then introduced into sampling circuit 21 which samples the video signal at appropriate intervals to produce a series of amplitude modulated pulses. Again, a 250 KHz rate was chosen for 1600 elements/line resolution. This output is amplified and used to pulse the laser as before. The specific circuits needed to perform the functions illustrated in FIGS. 2A and 2B are well-known for other facsimile printers and are consequently not discussed in detail.

The remaining portions of the basic system illustrated in FIG. 1, which perform the printer operation, will now be described in reference to FIGS. 3–5.

Figure 3A:
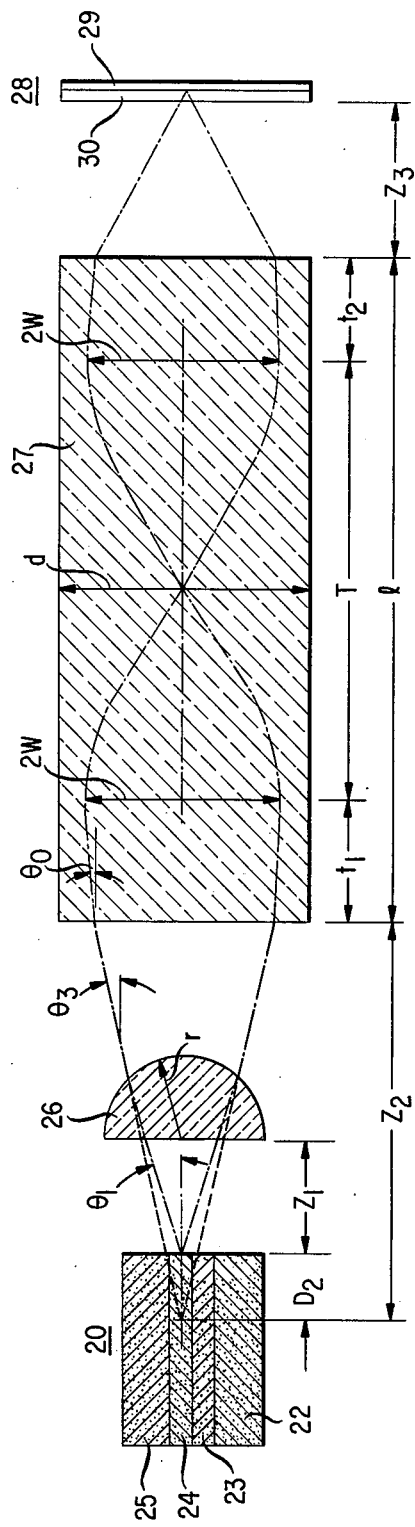
FIGS. 3A-3B are schematic illustrations of the optical components used for printing in accordance with one embodiment of the invention viewed in planes perpendicular to the laser junction and parallel to the laser junction, respectively.
Figure 3B:
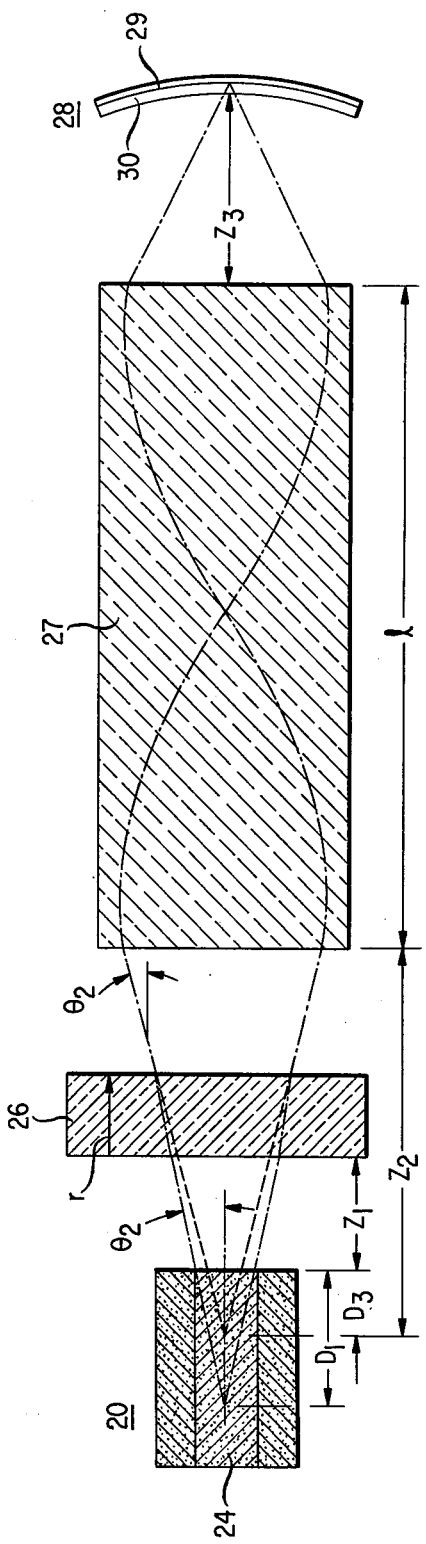

The basic optical components of the printer in accordance with one embodiment are illustrated schematically in FIG. 3A–3B, which are cross-sectional side and top views, respectively. It will be appreciated that these and the remaining figures are not necessarily drawn to scale.

The solid state laser, 20, was a GaAs stripe-geometry double-heterostructure laser which is well-known in the art. Such a laser basically comprises successive layers of N-type GaAlAs, 22, n-type GaAs, 23, p-type GaAs, 24, and p-type GaAlAs, 25, formed on a GaAs substrate (not shown). Optical waves are confined mainly to the region of GaAs 24 within the stripe width usually defined by proton bombardment. (For a more detailed discussion of this type of laser, see *Journal of Applied Physics*, Vol. 44, No. 3, March 1973 at pages 1276–1280.) The stripe width was approximately 12 microns and the size of the laser was approximately 375 × 250 × 100 microns. In order to machine round holes reproducibly, lasers which operate in the lowest order mode normal to the junction plane can conveniently be used. It will be clear to the skilled artisan that other solid state laser designs may be used in the invention.

Two basic problems associated with use of GaAs laser for machining are the astigmatism and elliptical cross-section of the output beam. These characteristics are illustrated by the rays, represented by dot-dashed lines, emanating from the laser in a plane perpendicular to the junction (FIG. 3A) and in plane parallel to the junction (FIG. 3B). Specifically, the laser beam viewed in a plane normal to the junction plane for the GaAs laser used here typically has a far-field divergence half-angle $\theta_1$ of approximately 25–30° (measured at $1/e^2$ of peak intensity) with an apparent source at the laser output mirror, while the laser beam viewed in the plane parallel to the junction has a far-field divergence half-angle $\theta_2$ of approximately 6–8° and an apparent source at a distance, $D_1$, of approximately 20–50 microns behind the laser output mirror.

In accordance with one feature of the invention, these problems are corrected by using a small hemicylindrical lens, 26, or radius $r$ in the path of the laser beam at the distance $Z_1$ from the laser output mirror face. In the plane normal to the junction plane (FIG. 3A), the lens is chosen so that the angle of divergence $\theta_3$ is made approximately equal to the angle of divergence $\theta_2$ in the plane parallel to the junction plane. An appropriate choice of the size of the lens will also refract the light rays in the normal plane so that the apparent source is moved behind the laser mirror a distance $D_2$ and will refract the rays in the parallel plane (FIG. 3B) so that the apparent source is moved closer to a distance $D_3$ from the output mirror until both sources are equidistant from the mirror ($D_2 = D_3$). This is illustrated by the dashed lines of FIGS. 3A and 3B, i.e., the dashed lines represent the apparent path of the light rays as a result of the correction by the hemicylindrical lens. The result of the operation by the lens is to convert the laser output beam into an approximately nonastigmatic circular cross-sectional beam which is useful for machining. The fact that a single hemicylindrical lens can so convert the beam for reasonably efficient machining is surprising.

Typically, a cylinder radius $r$ of approximately 12.5 microns and a laser-lens separation ($Z_1$) of approximately 7 microns were used to produce a circular, non-astigmatic beam diverging in an approximate $f/4$ cone. Of course the size of the lens and separation of the laser and lens may be varied. In particular, it can be shown that in order to make $\theta_3 = \theta_2$ to produce a circular beam, the ratio of the distance of the lens from the laser, $Z_1$, and the radius $r$ of the lens can be estimated from the paraxial equation:

$$\frac{Z_1}{r} \approx \frac{1}{n_1(n_1 - 1)} \left[ 1 - n_1 \frac{\theta_2}{\theta_1} \right] \quad (1)$$

where $n_1$ is the index of refraction of the lens, $\theta_2$ is the divergence half angle in the plane parallel to the junction (FIG. 3B) and $\theta_1$ is the divergence half angle in the plane perpendicular to the junction (FIG. 3A). In order to make the apparent sources coincide ($D_3 = D_2$), it can also be shown that:

$$r \left[ \frac{\theta_1}{n_1 \theta_3} - 1 \right] + Z_1 \left[ \frac{\theta_1}{\theta_3} - 1 \right] = D_1 - r \left[ 1 - \frac{1}{n_1} \right] \quad (2)$$

where $D_1$ is the distance of the apparent source from the output mirror uncorrected by the lens in the plane of the junction (FIG. 3B). Thus, solving equations (1) and (2) gives a value of $r$ and $Z_1$ to produce a non-astigmatic circular beam in accordance with one feature of the invention. Equations (1) and (2) are true for small angles; therefore, the output beam does have some spherical abberation.

In general, it is contemplated that the radius, $r$, should be within the range 1 – 1,000 microns and the separation of the lens from the laser $Z_1$ within the range of 0 – 1,000 microns in order to be compatible with the total micro-optical system. Particular values will depend on the type of laser used and the astigmation and ellipticity of the emerging beam as defined by equations (1) and (2).

As a means of focusing the diverging beam from the hemicylindrical lens, an optical fiber 27 with a graded index of refraction was utilized. The particular fiber used was one sold by Nippon Sheet Glass Company, Ltd. under the trademark SELFOC. The fiber is made of glass and is characterized by a parabolic radial index of refraction. That is, the index of refraction, $n_2$, of the fiber is related to the index of refraction, $n_0$, at the axis of the fiber and the distance $r_1$ from the fiber axis by the relationship:

$$n_2 \approx n_0 [1 - (ar_1^2/2)] \quad (3)$$

where $a$ is a constant which is characteristic of the fiber. The fiber thus acts like a series of spherical lenses to focus the laser beam as shown in FIGS. 3A and 3B. The two ends of the fiber are polished flat, and the length of the fiber determines the focal length. Advantageously, the beam emerging from the fiber is focused to a spot of approximately 5 micron diameter for optimum machining. Convenient fiber parameters were found to be a length, $l$, of approximately 12.9 mm, and $a \approx 0.43$ mm$^{-2}$. This fiber provided a distance $Z_3$ from the end of the fiber to the recording medium, 28, of approximately 0.7 mm and an f-number of approximately 4.4 when placed at a distance from the apparent source, $Z_2$, of approximately 0.6 mm. Of course, these values are illustrative of the parameters which may be used in accordance with the invention and such parameters may be adjusted according to particular needs. In particular, from the equation for the path of the light rays based on the radial distribution of the fiber index of refraction, the following equations can be derived:

$$Z_2 = 1/(n_0 \sqrt{a} \tan(t_1 \sqrt{a})) \quad (4)$$

where $t_1$ is the distance from the input face of the fiber to the closest point of maximum beam width as shown in FIG. 3A;

$$Z_3 = 1/[n_0 \sqrt{a} \tan(t_2 \sqrt{a})] \quad (5)$$

where $t_2$ is the distance from the output face of the fiber to the closest point of maximum beam width as shown in FIG. 3A;

$$t_1 + t_2 = l - NT \quad (6)$$

where $l$ is the total length of the fiber, $N$ is an integer and $T$ is the length of a complete period of beam focusing;

$$2W = (2\lambda/\pi W_{in}) \sqrt{Z_2^2 + (1/n_0^2 a)} \quad (7)$$

where $2W$ is the width of the beam at its maximum, $2W_{in}$ is the width of the beam at the apparent source and $\lambda$ is the wavelength of the light; and $$2W_{out} = 2W_{in} (\sin(t_1 \sqrt{a})/\sin(t_2 \sqrt{a})) \quad (8)$$

where $2W_{out}$ is the width of the beam at the focused spot on the recording medium. Thus, once the diameter of the lens is chosen, 2W can be assigned so that $2W < d$ and $Z_2$ found from equation (7). $t_1$ and $t_2$ can then be found from Eqs. (4) and (8) respectively since $2W_{in}$ is characteristic of the laser and $2W_{out}$ is chosen. Then equation (5) can be used to solve for $Z_3$ and Eq. (6), assuming a value for N, for the length $l$ of the fiber. N is conveniently chosen so that the laser may be placed as close as possible to the axis of rotation of the deflecting support arm to be described (in this embodiment, N = 2). Preferably, $l$ lies within the range of 1 – 20 mm for producing a reasonable size frame without resulting in too great a moment of inertia of the support arm. The diameter $d$ of the fiber is optimally within the range 10 – 40 mils. If the diameter is below this range, the working distance ($Z_3$) will tend to be too small to allow a free deflection of the optical components as described later. A diameter above this range will tend to produce a too great a moment of inertia to allow a fast enough horizontal scanning of the support arm also to be described.

The beam emerging from the lens fiber is focused on recording medium 28 which typically comprises a radiation absorbing film 29 formed on a transparent substrate 30. In this particular embodiment, the film was a multilayer of approximately 1 micron of iso-butyl-methacrylate, 75 Angstroms of bismuth, 600 Angstroms of selenium and 325 Angstroms of bismuth, and the substrate was a polyester material such as Mylar of about 0.002 inches thickness. It will be clear that the invention is not limited to machining this particular film and other types of films known in the art may be utilized. In this embodiment the film was back-machined, i.e., the beam was incident from the substrate side of the film primarily to protect the film when it is moved for vertical scan or to write a new frame as explained in more detail later. However, front machining, where the beam is directly incident on the film, is also possible. It will be noted from FIG. 3B that the recording medium is curved so that the film always lies in the focal plane of fiber lens 27 during horizontal scanning.

Figure 4A:
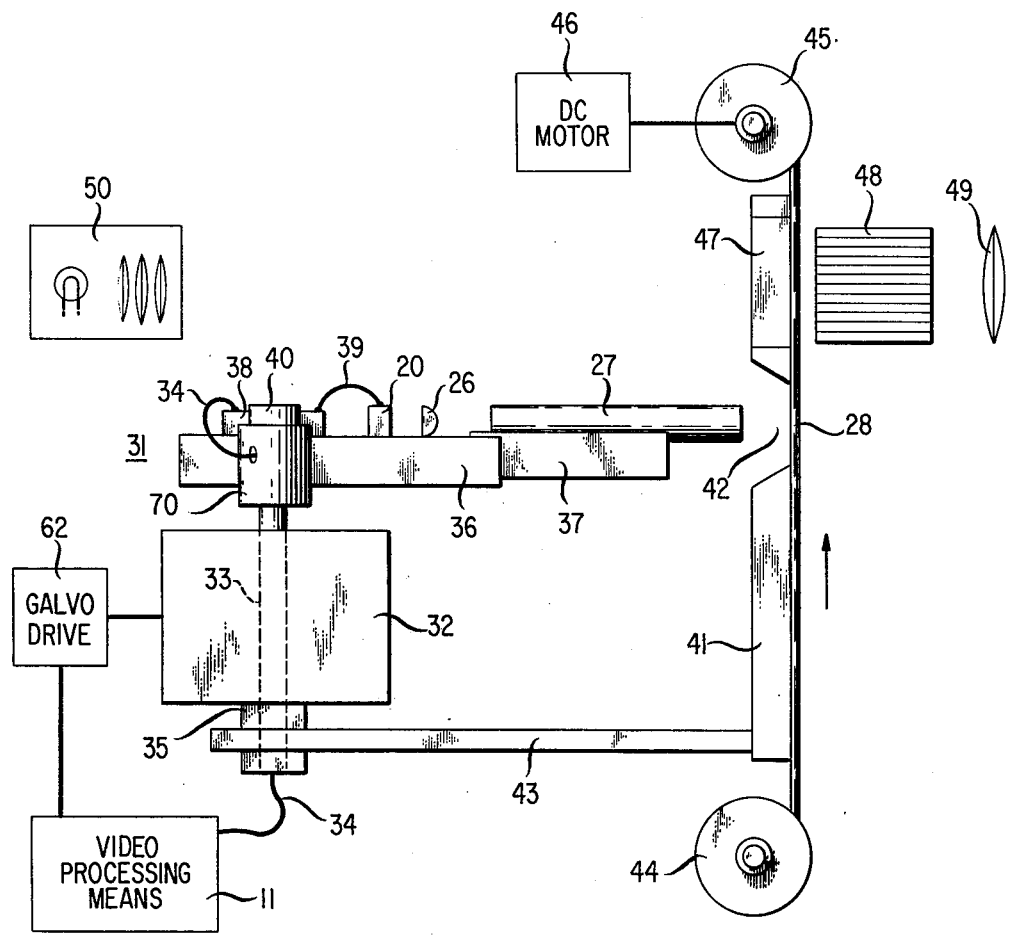
FIGS. 4A-4B are partly schematic side and top views respectively of apparatus used for printing in accordance with one embodiment of the invention.
Figure 4B:
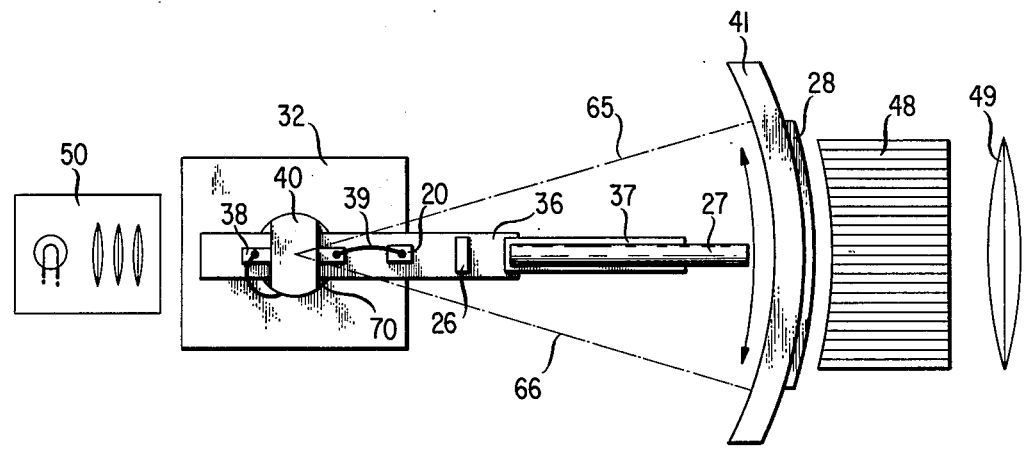

The printer apparatus used to achieve horizontal and vertical scan with the optical components described above are shown, in one embodiment, in the partly schematic side and top views, respectively, of FIGS. 4A and 4B. Elements which correspond to those shown in FIGS. 3A–3B are similarly numbered. The laser, 20, hemicylindrical lens, 26, and optic fiber lens, 27, are all mounted on an arm 31 which is coupled to a means for deflecting the arm such as the shaft of a galvanometer 32. Several commercially available galvanometers may be utilized in accordance with the invention. A particular model found to give the fastest sweep time consistent with good linearity over an 8 mm scan line was Model No. G124 manufactured by General Scanning Company. The galvanometer was modified, however, to fit the particular needs of the present invention. The shaft 33 was made hollow so that the laser could be connected to the video processing means 11 by means of wire 34 passing therethrough (the wire 34 is actually a strip line insulated from the shaft by a plastic tube). This is a convenient means of electrical connection which allows the leads to experience only an axial twisting motion during scanning. Also, the cylinder 35 at the bottom which was used for mounting purposes was advantageously made concentric with respect to the shaft to within approximately 0.0001 inches. This is to insure that when the apparatus is assembled, the axis of rotation of the arm coincides with the radius of curvature of the film, as will become clearer in the subsequent discussion. This particular galvanometer is capable of shaft rotation of approximately ± 12°. The distance from the galvanometer axis to the film was chosen to be approximately 19 mm which permits an 8 mm wide image to be written if the full 24° deflection angle is used.

Advantageously, the arm is composed of two sections, one made of copper, 36, and one made of aluminum, 37. The copper portion 36, provides a heat sink for the laser. The aluminum portion, 37, on which the fiber lens 27 is mounted is lighter an so the arm moment of inertia is kept at a low value. The fiber lens is epoxied into the A1 channel (see FIG. 4B) which is in turn epoxied to the end of the Cu channel. The fiber lens is conveniently long enough (approximately 12.9 mm) to allow the laser and the Cu channel to be mounted close to the galvanometer shaft for low moment of inertia. The laser, 20, may also be silver epoxied to the Cu channel. The laser can, advantageously, be coupled to the drive circuit by means of wire 39 through a ceramic member, 38, which is glued to the center of the arm. This feature allows the laser to be replaced without disturbing the wire 34 coupled to the drive circuit. Clamp 40 attaches the arm to a copper coupler 65 attached to the galvanometer shaft. A channel is also provided in the copper coupler to allow the arm to be slidably positioned.

The hemicylindrical lens 26 may also be secured to the arm by epoxy at the correct distance from the laser as given by equations (1) and (2). Conveniently, the lens may be positioned optically by observing the laser output beam through the lens with an infrared image converter microscope whose axis is collinear with the arm. When the output beam is approximately circular, the lens is in the proper position with the flat face approximately parallel to the laser mirror face. Similarly the fiber lens 27 may be epoxied into the A1 channel 37 at the position given by equation (7). Optically, this can be achieved by observing the machining of the film 28 with the laser in operation. In this particular apparatus, it was found that positioning the fiber lens approximately 0.24 inches from the hemicylindrical lens gave the desired $f/4.4$ output beam.

The output beam from fiber lens 27 is focused on film 28. The film is made to conform to the surface of a cylindrical portion 41 as shown in FIGS. 4A and 4B and machining occurs through slot 42 in the cylindrical portion. The galvanometer is driven by a galvanometer drive circuit illustrated as block 62 which provides a suitable ramp and retrace step output in response to video processing means 11, so that a horizontal line of information is written by the deflection of the arm 31 on which the optical components are mounted. (The approximate initial and final positions of the optical fiber axis for printing a line of the image are illustrated as dashed lines 65 and 66 respectively). In this particular embodiment, the total moment of inertia of the complete arm and coupler was approximately 0.15 gm-cm$^2$ which gives a loaded resonance frequency of approximately 230 Hz. Thus, the maximum sweep rate desired is approximately 150 Hz to insure good linearity, and it was found that the optimum sweep rate was approximately 100 Hz to write a frame of 2,070 lines (1600 elements/line) in approximately 20 sec, which means a round trip sweep time of approximately 9.6 msec. One of the surprising features of the invention is that such rapid deflection does not cause the optical components to move or become misaligned. In general, the maximum sweep rate desirable in accordance with the invention to maintain linearity is two-thirds of the resonance frequency of the particular galvanometer and arm combination. The minimum sweep time desirable for writing a frame in a resonable length of time is believed to be approximately 5 Hz. It is also believed that the moment of inertia should advantageously not exceed 130 gm-cm$^2$.

To insure that the spot of the output beam will be focused on the film over the complete scan line, the galvanometer shaft 33 should be concentric as nearly as possible with the center of curvature of the cylindrical portion 41. This is accomplished by fitting the bottom cylinder 35 of the galvanometer into a hole formed in member 43 which is attached to cylindrical portion 41. The center of this hole corresponds to the center of curvature of the cylindrical portion 41, and since the shaft 33 is made concentric with the galvanometer cylinder 35, a close coincidence between the shaft and the center of curvature is established. Preferably, the galvanometer shaft should be concentric with the center of curvature to within ±0.0004 inches to insure that the film is in focus across the complete scan line. The only subsequent adjustment necessary is positioning the arm radially by sliding it through the coupler 41 until the position which gives the largest round holes in the film is achieved. An optimum hole size is believed to be 4 – 6 microns. It will be realized that the printer in accordance with this embodiment is quite compact, measuring approximately 3 × 1$^1$/2 × 1$^1$/2 inches (minus projection optics, motor and electronics).

To achieve vertical scan, the film is moved essentially normal to the plane of horizontal scan (upward in FIG. 4A) so that a new line may be written each time the arm returns to its initial position (as illustrated by line 65 in FIG. 4B). This is accomplished by rotating reels 44 and 45 on which the film is threaded by means of a d.c. motor, illustrated as block 46, which drives reel 45. (The motor and reels have been omitted from FIG. 4B for easy viewing of the remaining components). The speed of vertical motion is chosen to give the proper aspect ratio of the recorded image and to give contiguous machined holes in the vertical direction for an all-white video input. The particular speed utilized here was such as to move an entire frame of 2,070 lines across slot 42 in approximately 20 seconds, although clearly the speed should be adjusted for particular needs. (Similarly, it should be clear that the amplitude of deflection of the galvanometer arm is set by the galvanometer drive circuit to give contiguous machined holes in the horizontal direction for an all-white input). In this particular embodiment, the motor is set to continuously move the film during the writing of the frame. Since the arm speed is so much greater than the vertical speed of the film, no noticeable slope in a line of holes is observed. If, desired, however, the motor 46 can be coupled to video processing means 11, and the electronics chosen so that the film is stationary while the arm is deflected from its initial position 65 to its final position 66 and the film is moved up while the arm is returned to its initial position so that a new line can be written. Since the film is moved over the surface of the cylindrical portion, back machining, where the light is incident through the transparent substrate, is preferred to prevent scratching of the film. Several means may be employed to keep the film pressed against the cylinder 41. In this embodiment, a gate (not shown) which included pads was mounted on the cylinder such that the pads pressed against the edges of the film to conform it to the cylinder. To further conform the film, a vacuum chamber was constructed in the cylinder wall and the film held against the cylinder by vacuum action through holes (not shown) drilled around the writing slot 42.

If desired, the optical information can be displayed soon after it is machined in the film. In furtherance of this objective, a quartz window 47 was incorporated in the cylinder just above the writing slot 42. The projection light beam was provided by a standard condenser system illustrated schematically as the light source and lenses within block 50. Light from the condenser system was directed through the window and the beam projected on a screen (not shown) through a standard projection lens 49. In order to correct for the curvature of the film, a field flattening element, 48, was interposed between the film and the projection lens. The field flattening element was a fiber faceplate consisting of closely packed 3 micron diameter optical fibers with one side of the faceplate ground and polished to match the curvature of the film while the opposing face was polished flat (see FIG. 4B). In place of element 48, a standard field flattening lens may be used. Thus, it will be appreciated that soon after the start of writing, since the film is advancing upward, the microimage can be displayed on a flat screen without blocking by the galvanometer and arm. Utilizing an $f/1.8$, 10 mm focal length lens, 49, the path from projection lens to screen was approximately 14 inches. One can, however, fold this path length by means of mirrors in order to incorporate the screen in the printer housing.

Figure 5A:
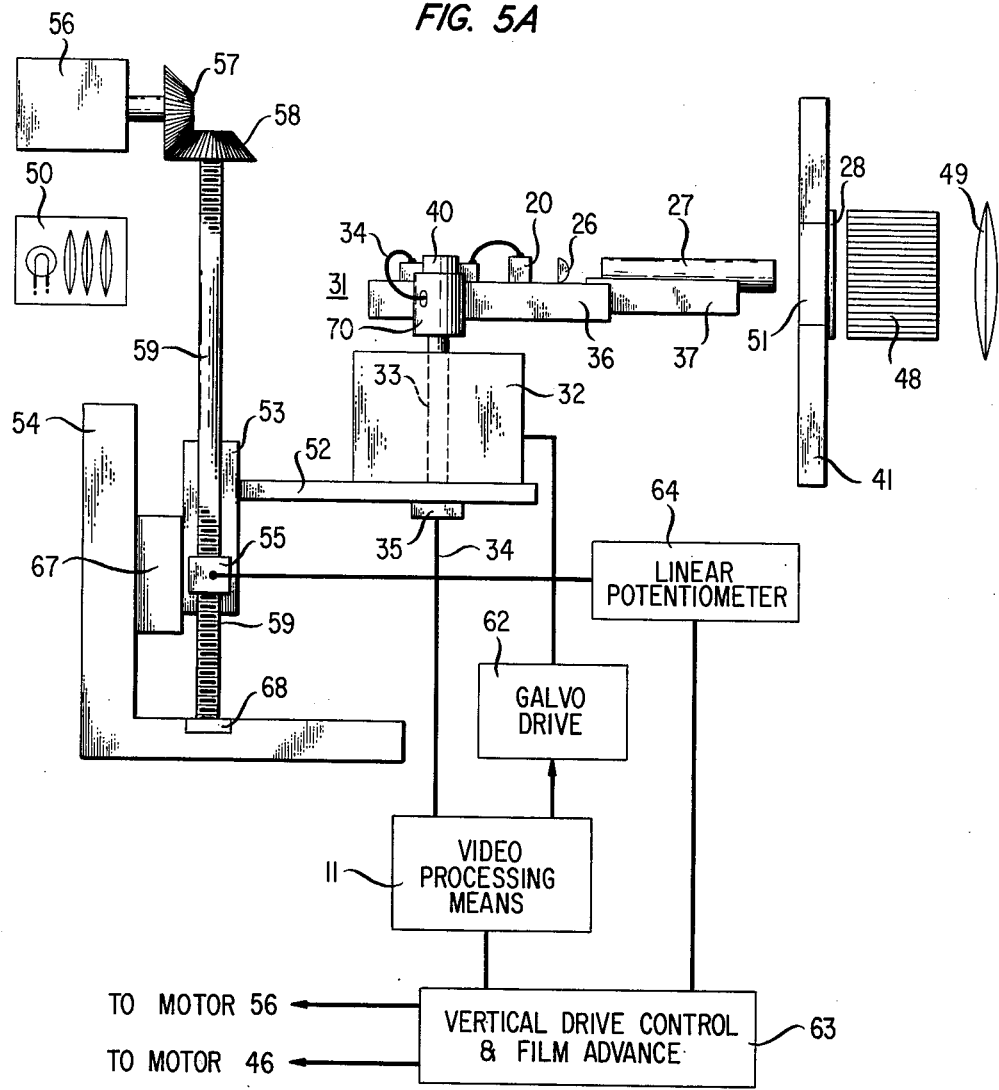
FIGS. 5A-5B are partly schematic side and top views respectively of apparatus used for printing in accordance with a further embodiment.
Figure 5B:
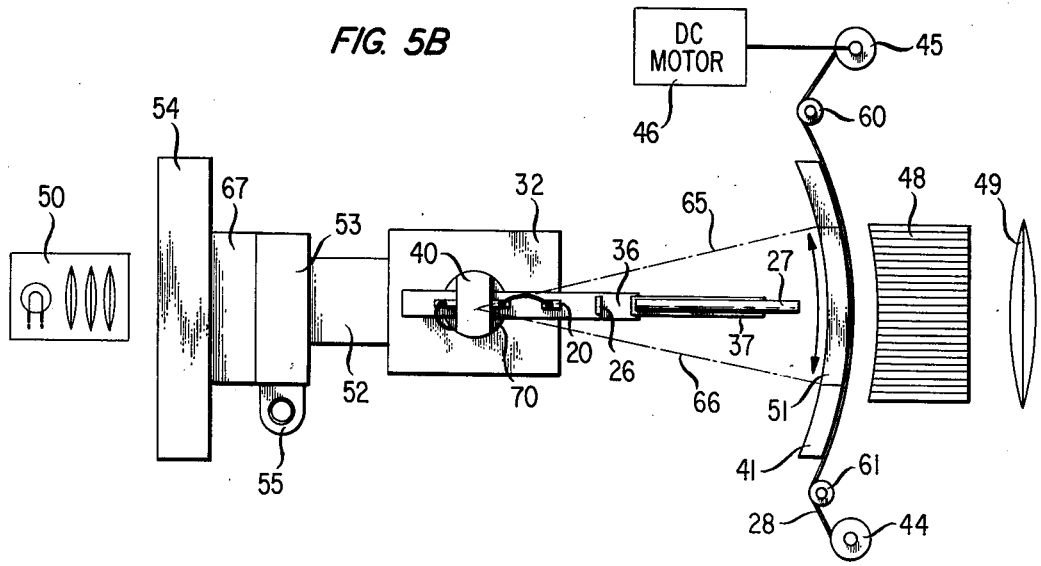

If it is desired to have real time viewing of the recorded information, a stationary film printer in accordance with a further embodiment of the invention can be constructed as shown in FIGS. 5A–5B. These figures are side and top schematic views of the embodiment, with elements corresponding to those of FIGS. 4A–4B similarly numbered.

As shown, the same optical components and galvanometer arm are utilized in this embodiment. As before, horizontal scan is achieved by deflecting the galvanometer arm at a desired speed. Here, however, the film 28 remains stationary as a frame is written. At the same time, the information is displayed by basically the same equipment as before. (Condenser 50, field flattener 48 and projection lens 49). One modification is the use of a curved quartz window, 51, with an outside radius of curvature equal to the radius of curvature of cylinder 41 (see FIG. 5B). The machining beam passes through the window without a change in the focused spot size and permits simultaneous display of the optical information. The window thickness was approximately 0.009 inches (±0.0006 inches over the frame area to prevent noticeable variation in hole size) and the window fiber lens separation was approximately 0.022 inches.

Vertical scan in this embodiment is achieved by moving the galvanometer, rather than the film, in a downward direction of FIG. 5A. As before, this motion can be continuous or stepwise (only during retrace of the arm). This motion can be achieved, for example, by attaching galvanometer 32, by means of support 52 to a sliding member 53 which is slidably mounted on stationary member 67. The latter member is, in turn, mounted on an L-shaped support 54. The sliding member 53 and stationary member 67 in this embodiment comprise a commercially available apparatus known as a Schneeberger NK2-35 linear slide. The vertical motion of the slide is accomplished by means of a d.c. motor 56 (which in this example was a Globe 311A 242 – 6 motor) coupled by means of gears 57 and 58 to a micrometer screw 59. The micrometer screw is mounted in member 68 which is attached to platform 54 to allow the screw to rotate but not translate. The screw passes through a nut, 55, which is attached to the side of the sliding member 53 (see FIG. 5B, where the nut is shown but the screw and motor are omitted for easy viewing). The threads of the screw 59 engage the grooves of nut 55 so that the rotational motion of the screw is translated into the vertical motion of the slide 53 and hence galvanometer 32. Thus, as a frame is being written, the galvanometer moves down out of the way of the projection optics so that the information can be viewed on a screen (not shown).

Once again, the shaft 33 of the galvanometer should coincide with the center of curvature of cylindrical portion 41. This was achieved by using a centering plug mounted in a hole in a member such as 43 of FIG. 4A coupled to cylindrical portion 41, which hole was concentric with the cylinder axis. (The member 43 is not shown in this figure for the sake of simplicity.) The galvanometer cylinder 35 was fitted in the plug before coupling to support member 52 and the plug eventually removed. It was found that shaft 33 deviated from the center of curvature of cylinder 41 by less than 3 microns over the complete vertical travel of the galvanometer, which as approximately 15 mm.

The strip line, 34, that emerges from the galvanometer flexes as the galvanometer moves up and down, but it was found that this has no noticeable effect on the writing operation.

As shown in FIG. 5B, the film may be made to conform to the cylindrical portion 41 in wraparound fashion by rollers 60 and 61. After a frame is written, the film is advanced in a direction horizontal to the direction of line scan by d.c. motor 46 coupled to reel 45. The images on the film strip are, therefore, rotated 90° with respect to the images made by the embodiment of FIGS. 4A–4B, and cassette loading of the film is most convenient.

The basic electronic system is also shown in block form in FIG. 5A. As in the previous embodiment, the signals from the video processing means 11 drive the laser 20 through strip line 34 and the galvanometer through the galvanometer drive circuit 62. A circuit for vertical drive control and film advance is illustrated as block 63 with outputs coupled to motors 46 and 56. A linear potentiometer 64 is also coupled to nut 55 to provide feedback control to the vertical drive circuit. Again, the precise circuitry necessary to operate the apparatus in the manner described is varied and can be easily supplied by the skilled artisan. Consequently, a more detailed discussion of this matter is omitted for the sake of brevity.

Over 100 frames of optical information were printed with the two embodiments of FIGS. 4A–B and 5A–B. The machined images included both positives and negatives, and aspect ratio and grey scale rendition were varied by adjusting circuit parameters. In general, the images were of high quality. One problem encountered with the embodiment of FIG. 5A–B was the production of interference fringes by the quartz window. This problem was significant only for grey-scale rendition, and of course the problem is eliminated by use of the FIG. 4A–B embodiment. Some aberrations were introduced by the cylindrical and fiber lenses, requiring more power to machine holes than in prior art apparatus using diffraction-limited beams. Some improvement may be gained by bonding the cylindrical lens to the input face of the fiber lens thus eliminating two glass-air boundaries. The fiber faceplate field flattening element had some undesirable effects in forming some black spots on the projected image and reducing resolution. This problem can be dealt with by using other field flattening means or by flattening the film about two frames after the recorded region in the FIG. 4A–B embodiment if real-time viewing is not essential.

Several modifications other than those previously described are possible. For example, the focusing function of fiber lens 27 could in theory be performed by other types of lenses such as a small diameter convex lens. The fiber lens previously described is presently preferred, however. Also, other means may be employed to correct the astigmatism and ellipticity of the laser beam, such as abutting to the output face of the laser an optical fiber with a circular core or similar type of arrangement. Again, the hemicylindrical lens is clearly preferred. Also, the hemicylindrical lens might be placed so that the flat surface faces away from the laser, although a different set of equations would define the dimensions. Finally, although the apparatus is specifically designed for use with a GaAs laser, other solid state semiconductor lasers may be utilized in accordance with the invention for facsimile printing. Such lasers, including modified forms of GaAs lasers, might be fabricated so as to produce an essentially circular non-astigmatic beam. In such cases, the hemicylindrical lens may be omitted and a system fabricated in accordance with the other features of the invention.

Various additional modifications will become apparent to those skilled in the art. All such variations which basically rely on the teachings through which the invention has advanced the art are properly considered within the spirit and scope of the invention.

What is claimed is:

1. Appartus for forming an image in the form of discrete holes on a recording medium in response to an input signal representing video information comprising:
   a laser medium adapted to emit pulses of coherent radiation in the form of an astigmatic elliptical beam in response to said input signal;
   means for focusing said radiation onto said recording medium comprising an optical fiber with a parabolic radial index of refraction;
   a hemicylindrical lens interposed between said laser and said optical fiber with the flat surface of said lens facing said laser, said hemicylindrical lens having a radius and being positioned at a distance from said laser so as to convert said radiation into an approximately nonastigmatic circular beam;
   said laser, optical fiber and hemicylindrical lens being mounted on a support which is capable of being deflected over a prescribed arc by rotation about an axis of said support;
   means for conforming the recording medium to an arc concentric with the arc defined by said support; and
   means for periodically deflecting said support in one direction from an initial position across the prescribed arc so as to scan a line of said recording medium and in the opposite direction to return the support to its initial position.

2. The apparatus according to claim 1 further comprising means for moving said recording medium in a direction transverse to the plane of deflection of said support so that a new line of the image may be produced on said medium when the support lies in its initial position.

3. The apparatus according to claim 1 wherein the diameter of the optical fiber lies within the range 10 - 40 mils.

4. The apparatus according to claim 1 further comprising means for displaying said image on a screen as it is being produced on said recording medium.

5. The apparatus according to claim 1 wherein the means for deflecting said support comprises a galvanometer with a rotatably mounted shaft on which the support is mounted.

6. The apparatus acccording to claim 1 wherein the support is capable of being deflected at a sweep rate of approximately 100 Hz.

7. The apparatus according to claim 1 wherein the optical fiber is capable of focusing the radiation onto the recording medium so as to form holes with a diameter in the range 4–6 microns.

8. The apparatus according to claim 1 further comprising means for moving said support in a direction transverse to the plane of deflection of said support so tha a new line of the image may be produced on said medium when the support lies in its initial position.

9. The apparatus according to claim 8 further comprising means for moving said recording medium in a direction parallel to the plane of deflection of said support after a complete frame of said image is produced.

10. Apparatus for forming an image in the form of discrete holes on a recording medium with a diameter in the range 4-6 microns in response to an input signal representing video information comprising:
    a GaAs laser adapted to emit pulses of coherent radiation in the form of an astigmatic elliptical beam in response to said input signal;
    means for focusing said radiation onto said recording medium comprising an optical fiber with a parabolic radial index of refraction, a diameter within the range 10 – 40 mils, and a length within the range 1 – 20 mm;
    a hemicylindrical lens interposed between said laser and said optical fiber with the flat surface of said lens facing said laser, said lens having a radius within the range 1–1,000 microns and positioned at a distance within the range 0–1,000 microns from said laser so as to convert said radiation into an approximately nonastigmatic circular beam;
    a galvanometer with a rotatably mounted shaft;
    a support arm mounted on said shaft that said arm may be periodically deflected across a prescribed arc from an initial position to a final position in one direction and returned to the initial position by deflecting in the opposite direction at a sweep rate of approximately 100 Hz;
    said laser, optical fiber and hemicylindrical lens being mounted on said support arm such that a line of said image may be produced when the arm is deflected in said one direction;
    means for conforming the recording medium to an arc concentric with the arc defined by said deflecting support arm comprising a curved member with its center of curvature concentric with the shaft of the galvanometer;
    means for moving said recording medium in a direction transverse to the plane of deflection of the arm so that a new line of said image may be produced when the arm lies in its initial position; and
    means for displaying said image on a screen.

* * * * *